(12) United States Patent
Klintberg et al.

(10) Patent No.: US 11,831,185 B2
(45) Date of Patent: Nov. 28, 2023

(54) METHOD FOR OPERATING A SWITCHING ARRANGEMENT OF AN ENERGY STORAGE SYSTEM

(71) Applicant: VOLVO TRUCK CORPORATION, Gothenburg (SE)

(72) Inventors: Anton Klintberg, Gothenburg (SE); Faisal Altaf, Västra Frölunda (SE); Tobias Smidebrant, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/660,314

(22) Filed: Apr. 22, 2022

(65) Prior Publication Data
US 2022/0352727 A1 Nov. 3, 2022

(30) Foreign Application Priority Data
Apr. 29, 2021 (EP) .................... 21171095

(51) Int. Cl.
*H02J 7/00* (2006.01)
*B60L 58/18* (2019.01)

(52) U.S. Cl.
CPC ............ *H02J 7/0013* (2013.01); *B60L 58/18* (2019.02); *H02J 7/0031* (2013.01); *H02J 7/0063* (2013.01)

(58) Field of Classification Search
None
See application file for complete search history.

(56) References Cited

U.S. PATENT DOCUMENTS 6,765,316 B1 7/2004 Elsner et al.
2001/0033500 A1 10/2001 Hummert et al.
(Continued)

FOREIGN PATENT DOCUMENTS

DE 603128 C 9/1934
EP 2372867 A1 10/2011
WO 2014057011 A1 4/2014

OTHER PUBLICATIONS

Giancaterino J: "Application considerations for multiple battery disconnects", Telecommunications Energy Conference, 2000. Intelec. Twenty-Second International Sep. 10-14, 2000, Piscataway, NJ, USA,IEEE, Sep. 10, 2000 (Sep. 10, 2000), pp. 765-770, XP010523272, ISBN: 978-0-7803-6407-3 Chapter 3. Disconnecting Multiple Battery Strings; p. 768-p. 769; figures 1,2.
(Continued)

*Primary Examiner* — Jared Fureman
*Assistant Examiner* — Aqeel H Bukhari
(74) *Attorney, Agent, or Firm* — Venable LLP; Jeffri A. Kaminski

(57) ABSTRACT

A method for operating a switching arrangement of an energy storage system, the energy storage system comprising a plurality of parallelly arranged battery packs and the switching arrangement comprising an associated contactor for each battery pack, the contactors being configured to connect and disconnect the battery packs relative a load by closing and opening, respectively. The method comprises disconnecting the battery packs from the load by means of the contactors such that the battery packs are disconnected in a sequence in which one contactor is opened last and thereby subject to increased disconnection wear, controlling the sequence in which the battery packs are disconnected in such a way that the increased disconnection wear is accounted for and used to distribute contactor wear among (Continued)

the contactors during subsequent disconnections of the battery packs from the load.

15 Claims, 3 Drawing Sheets

(56) References Cited

U.S. PATENT DOCUMENTS

| | | |
|---|---|---|
| 2007/0046233 A1 | 3/2007 | Kobielski |
| 2007/0268640 A1 | 11/2007 | Brereton et al. |
| 2011/0234006 A1 | 9/2011 | Deng et al. |
| 2012/0013182 A1 | 1/2012 | Minegishi et al. |
| 2012/0306264 A1 | 12/2012 | Komma et al. |
| 2013/0063091 A1 | 3/2013 | Nishi et al. |
| 2013/0285456 A1 | 10/2013 | Feuerstack et al. |
| 2020/0290480 A1* | 9/2020 | Tsubaki ............... B60L 58/18 |
| 2020/0317076 A1 | 10/2020 | Wang et al. |
| 2021/0096184 A1 | 4/2021 | Zenati et al. |
| 2021/0098205 A1 | 4/2021 | Langer et al. |
| 2023/0016562 A1* | 1/2023 | Maarbjerg ........ H02M 7/53871 |

OTHER PUBLICATIONS

European Search Report dated Oct. 7, 2021 in corresponding European Patent Application No. 21171095.9, 10 pages.
European Search Report dated Nov. 4, 2021 in corresponding European Patent Application No. 21171108.0, 7 pages.
U.S. Non Final Office Action dated Jun. 27, 2023 in related U.S. Appl. No. 17/660,296, 11 pages.

\* cited by examiner

METHOD FOR OPERATING A SWITCHING ARRANGEMENT OF AN ENERGY STORAGE SYSTEM

TECHNICAL FIELD

The present invention relates to a method for operating a switching arrangement of an energy storage system. The invention further relates to a switching arrangement for a vehicle, an energy storage system for a vehicle, and to a vehicle.

BACKGROUND

A vehicle typically comprises an engine or machine for propelling the vehicle. The engine may be powered by various means, such as e.g. by a liquid or gaseous fuel in an internal combustion engine, or by electric power to an electric machine. Moreover, hybrid solutions exist in which e.g. the vehicle is propelled both by an internal combustion engine and an electric machine. In either way, an energy storage device is used to store the energy needed in order to propel the vehicle. Energy storage devices may further be used to power auxiliary loads in the vehicle.

For many vehicles, the energy storage devices are comprised in an energy storage system, wherein the energy storage system is configured to power the electric machine for propelling the vehicle, as well as any auxiliary load. For example, for an electric vehicle, the energy storage devices may be batteries, which are configured to operate the electric machine as well as electrically driven auxiliary equipment. The electric machine and/or the electrically driven auxiliary equipment may be commonly referred to as a load. Several batteries, or several series-connected and/or parallel connected battery cells, may be grouped into a battery pack. The battery pack is periodically in need of charging, and is then electrically connected to an electrical energy source, e.g. via plug directly connected to the power grid.

In many applications, several battery packs are configured to power the load by being parallelly connected to a traction power bus (or traction voltage bus). Hereby, the supplied power can be adapted based on the number of battery packs, and/or higher power requirements of the vehicle may be met. Typically, every battery pack is associated with a switch, or contactor, enabling connection and disconnection of each battery pack relative the load. Thus, when a contactor is closed, the associated battery pack is connected to the traction power bus and powers the load, and when a contactor is opened, the associated battery pack is disconnected from the traction power bus and does no longer power the load. However, every time the state of a contactor is changed from closed to open, or vice versa, the contactor is subject to mechanical and electrical wear.

The electric wear of the contactor is typically higher than the mechanical wear, and thus more significant for setting the life length of the contactor. Electric wear may e.g. origin from electric arcs in the air gap of a non-closed contactor. Electric arcs typically appear when the voltage over the air gap exceeds the breakdown voltage of air (3 kV/mm) or when an inductive circuit is broken since an inductor opposes a change of the current through it. The electric breakdown voltage will typically be exceeded when a contactor is opened under load since the air gap initially is zero. The resistivity of the resulting electric arc is low meaning that the electric arc will be sustained for a short time before it is interrupted. When a contactor is closed, on the other side, the electric breakdown voltage is typically exceeded just before the contactor reaches a fully closed state, resulting in a small electric arc. However, the electric wear originated by inductance can be much more severe than the wear from exceeding the electric breakdown voltage.

Contactor wear as described above may lead to contactor failure. In particular, premature contactor failure of a single contactor is undesirable, as sometimes more than the failing contactor have to be replaced, which may be very expensive.

SUMMARY

It is an object of the present invention to at least to some extent alleviate the shortcomings discussed above in relation to known energy storage systems and battery packs, and to improve the operation of connecting and disconnecting the battery packs relative a load.

According to at least a first aspect of the present invention, a method for operating a switching arrangement of an energy storage system, the energy storage system comprising a plurality of parallelly arranged battery packs and the switching arrangement comprising an associated contactor for each battery pack, the contactors being configured to connect and disconnect the battery packs relative a load by closing and opening, respectively, is provided. The method comprises:
  disconnecting the battery packs from the load by means of the contactors such that the battery packs are disconnected in a sequence in which one contactor is opened last and thereby subject to increased disconnection wear,
  controlling the sequence in which the battery packs are disconnected in such a way that the increased disconnection wear is accounted for and used to distribute contactor wear among the contactors during subsequent disconnections of the battery packs from the load.

Hereby, the total life-length of the switching arrangement may be increased as the electric contactor wear, at least the increased disconnection wear of the contactors, is distributed among the contactors in the switching arrangement. Thus, excessive electric wear of a single contactor, e.g. leading to contactor failure, may be avoided. In other words, formation of electric arcs in the contactors are distributed among the contactors in the switching arrangement. During the disconnection of the battery packs from the load by means of the contactors, the battery packs are disconnected in a sequence in which one contactor is opened last and thus subject to increased disconnection wear due to the formation of electric arcs. The formation of such electric arcs is at least partly the result of residue energy, or residue inductance, remaining in the energy storage system subsequent to a shut-down of the load. In case the battery packs are configured to power an electric machine (i.e. the load is an electric machine), the most inductive part affecting the energy storage system is the electric machine and the cable connected to it. Thus, the electric arcs will be especially prominent in a scenario in which all battery packs of the energy storage system are being disconnected since the inductive circuit involving the electric machine will be interrupted or broken. In a scenario in which one battery pack is kept connected to the load, or a traction power bus, the formation of electric arcs during the disconnection of the other battery packs will be less prominent, as an alternative path of current is available (i.e. by the connected battery pack). By controlling the sequence in which the battery packs are disconnected in such a way that the increased disconnection wear is accounted for, or rather, by adapting the sequence in which the contactors are opened so that the contactor which is opened last is based on a distribution of contactor wear among the contactors, such increased disconnection wear due to the formation of electric arcs can be distributed among the contactors. Typically, this is achieved by varying the contactor which is opened last in a manner taking the distribution of contactor wear among the contactors into account. Thus, according to at least one example embodiment, the sequence includes disconnecting the battery packs such that one contactor is opened last, and varying that sequence so that different contactors are opened last. It should be understood that when referring to that a contactor is opened last, the last battery pack is disconnected from the load, and that after such disconnection, no battery pack is connected to the load.

It should be understood that the sequence comprises electrically disconnecting the battery packs from the load by means of the contactors such that the contactor which is to be subject to the increased disconnection wear is intentionally opened last. Thus, different contactors are controlled, by the switching arrangement, to be intentionally opened last. The operation of the contactors may e.g. be comprised in a control unit, such as an ECU, of a vehicle.

According to at least one example embodiment, the sequence is used to distribute the contactor wear evenly among the contactors, such that, over time, the disconnection wear is equal, or substantially equal, for all contactors. The relevant time scale may e.g. be daily, weekly, or monthly.

As the battery packs of the energy storage system are parallelly arranged, the contactors of the switching arrangement may be referred to as being parallelly arranged. That is, at least the contactors used for disconnecting the battery packs from the load may be referred to as being parallelly arranged.

According to at least one example embodiment, the term disconnecting may be referred to as electrically disconnecting, and the term connecting may be referred to as electrically connecting.

According to at least one example embodiment, the plurality of parallelly arranged battery packs is at least two, or at least three parallelly arranged battery packs. Thus, the switching arrangement comprises a plurality of parallelly arranged contactors, wherein each contactor is capable of connecting and disconnecting an associated battery pack. The plurality of parallelly arranged contactor is at least two, or at least tree parallelly arranged contactors.

It should be understood that the contactors which are configured to connect and disconnect the battery packs relative a load by closing and opening, respectively, may be referred to as main contactors.

According to at least one example embodiment, the energy storage system is connectable to an electrical energy source, e.g. the grid and an energy transferring means such as an electric cable. The energy storage system may comprise a charging interface, such as e.g. a socket being connectable to a plug of the electric cable. Hereby, the battery packs of the energy storage system may be charged. According to at least one example embodiment, each battery pack is associated with a pre-contactor arranged between the battery pack and the charging interface, enabling connection and disconnection of individual battery packs relative the electrical energy source. Thus, the energy storage system is connectable to an electrical energy source, and to a load, by means of contactors (i.e. the pre-contactors and the main contactors).

According to at least one example embodiment, the method comprises operating the switching arrangement according to a schema. The schema typically comprises the previously described step of disconnecting the battery packs from the load by means of the contactors such that the battery packs are disconnected in a sequence. The time interval for the disconnecting sequence may e.g. be between 0 and 10 s, such as e.g. between 1 ms and 5 s, or between 1 ms and 3 s, or between 1 ms and 1 s, i.e. between 1 ms and 1000 ms, or between 100 ms and 1000 ms. For example, the method may comprise to simultaneously, or almost simultaneously (e.g. within 50 ms), disconnect all the battery packs from the load by means of the contactors except for the contactor which is intentionally opened last (e.g. by being subject to a lag compared to the other contactors).

According to at least one example embodiment, the method comprises:
  connecting the battery packs by means of the contactors for powering the load,
  alternately connecting and disconnecting the battery packs, wherein the steps of disconnecting include controlling the sequence in which the battery packs are disconnected.

Thus, during subsequent events of powering the load, the contactor wear (at least owing to the increased disconnection wear) may be accounted for and used to distribute the contactor wear among the contactors. Hereby, premature failure, or excessive electric wear, of a single contactor can be avoided and the life-time of the sum of contactors increased.

It should be understood that when referring to connecting the battery packs by means of the contactors, the associated contactor for each battery pack closed in order for the battery packs to power the load. Correspondingly, when opening the associated contactor for each battery pack, powering of the load is terminated.

According to at least one example embodiment, the sequence comprises cycling which battery pack that is being disconnected last.

Hereby, a simply yet effective means of varying which contactor that is being opened last is provided. The cycling may e.g. be performed randomly, in which the contactor which is opened last is intentionally set according to a random distribution. The cycling may alternatively be performed in a determined manner in which the contactors which is opened last is intentionally varied according to a particular order, such as e.g. sequential, or successive.

According to at least one example embodiment, the step of controlling the sequence in which the battery packs are disconnected comprises keeping track of at least the increased disconnection wear of each contactor.

Hereby, a simply yet effective means of determining which contactor that should be opened last in a subsequent disconnection of the battery packs is provided. The information of the increased disconnection wear of each contactor may e.g. be stored in a memory, and used to determine the sequence in which one contactor is opened last. The increased disconnection wear may e.g. be indirectly accounted for by keeping track of how many times a specific contactor has been disconnected last. Thus, the method may comprise keeping track of (e.g. by storing information in the memory) of which contactor that was previously opened last, and upon a subsequent action of disconnecting the battery packs from the load, to open another contactor last.

According to at least one example embodiment, the sequence in which the battery packs are disconnected comprises disconnecting a battery pack other than the battery pack with the associated contactor having the highest increased disconnection wear last.

Hereby, the contactor being theoretically closest to a component failure (at least with regards to the accumulated disconnection wear) is intentionally avoided to be disconnected last. Thus, excessive electric wear of a single contactor, e.g. leading to contactor failure, may be avoided. Stated differently, the method comprises avoiding disconnecting the battery pack having the contactor with the highest increased disconnection wear last.

According to at least one example embodiment, the sequence in which the battery packs are disconnected comprises disconnecting the battery pack with the associated contactor having the lowest contactor wear, or lowest increased disconnection wear, last. Hereby, the contactor being theoretically furthest way to a component failure (at least with regards to the accumulated disconnection wear) is intentionally disconnected last. For example, the contactor which has been opened last the least amount of time is chosen to be opened last. Thus, excessive electric wear of a single contactor, e.g. leading to contactor failure, may be avoided. Stated differently, the method comprises disconnecting the battery pack having the contactor with the lowest increased disconnection wear last. According to at least one example embodiment, the contactors are divided into a low wear group and a high wear group, wherein the low wear group comprises the contactors having the lowest amount of accumulated contactor wear (e.g. comprising about 50% of the contactors), such as e.g. the lowest amount of increased disconnection wear, and wherein the sequence in which the battery packs are disconnected comprises disconnecting a battery pack with an associated contactor comprised in the low wear group. According to at least one example embodiment, over time, each contactor is opened last the same, or roughly the same, amount of time.

According to at least one example embodiment, the method comprises: remembering which battery pack that was previously disconnected from the load last, and upon a subsequent step of disconnecting the battery packs from the load via the contactors, disconnecting another battery pack from the load last than the battery pack that was previously used disconnecting last.

Hereby, an easy implemented but yet effective means for ensuring that different battery packs are disconnected last every time is provided. It should be noted that the step of remembering may be implemented in the previously mentioned cycling which battery pack that is being disconnected last.

According to at least one example embodiment, for each contactor, the contactor wear is referring to the electric wear of the contactor, and the increased disconnection wear is comprised in the electric wear of the contactor. According to at least one example embodiment, for each contactor, the contactor wear is referring to the increased disconnection wear of the contactor (i.e. the increased disconnection wear as a result of being opened last). According to at least one example embodiment, for each contactor, the contactor wear additionally comprises electric wear originating from other sources than the increased disconnection wear of the contactor (i.e. the increased disconnection wear as a result of being opened last). The contactor wear is typically referring to the accumulated contactor wear, i.e. the contactor wear accumulated over time.

According to at least one example embodiment, the method comprises
detecting a damaging current that upon disconnection of the battery packs from the load results in damaging a contactor, wherein the sequence in which the battery packs are disconnected comprises disconnecting the battery pack having the contactor with the highest contactor wear last to intentionally sacrifice such contactor in response of detecting the damaging current.

Hereby, in case of knowing that the at least one contactor is to be damaged upon disconnection of the battery packs, the contactor with the highest contactor wear may be intentionally sacrificed. The contactor wear may here be referring to the increased disconnection wear, i.e. the battery pack having the contactor with the highest increased disconnection wear is disconnected last to intentionally sacrifice such contactor in response of detecting the damaging current.

According to at least one example embodiment, the increased disconnection wear is caused by inductance.

Thus, the method for operating a switching arrangement of an energy storage system distributing contactor wear among contactors with regards to residue inductance caused by disconnection of an inductive load, such as e.g. an electric machine and the cable connected to it.

According to at least one example embodiment, the energy storage system is an energy storage system for a vehicle, and thus the switching arrangement is a switching arrangement for reducing contactor wear of an energy storage system in a vehicle. According to at least one example embodiment, each battery pack comprises a plurality of series-connected and/or parallel connected battery cells.

According to a second aspect of the present invention, a switching arrangement for an energy storage system in a vehicle, the energy storage system comprising a plurality of parallelly arranged battery packs, is provided. The switching arrangement comprises:
an associated contactor for each battery pack, the contactors being configured to connect and disconnect the battery packs relative a load by closing and opening, respectively,
wherein the switching arrangement is configured to:
disconnect the battery packs from the load by means of the contactors such that the battery packs are disconnected in a sequence in which one contactor is opened last and thereby subject to increased disconnection wear,
control the sequence in which the battery packs are disconnected in such a way that the increased disconnection wear is accounted for and used to distribute contactor wear among the contactors during subsequent disconnections of the battery packs from the load.

Effects and features of the second aspect of the invention are largely analogous to those described above in connection with the first aspect of the invention. Embodiments mentioned in relation to the first aspect of the invention are largely compatible with the second aspect of the invention, of which some embodiments are exemplified below, typically without repeating any advantageous effects.

According to at least one example embodiment, the switching arrangement is configured to:
connect the battery packs by means of the contactors for powering the load,
alternately connect and disconnect the battery packs, wherein, during disconnections, the switching arrangement is configured to control the sequence in which the battery packs are disconnected According to at least one example embodiment, the configuration of the switching arrangement to control the sequence comprises cycling which battery pack that is being disconnected last.

According to at least one example embodiment, the switching arrangement is configured to keep track of at least the increased disconnection wear of each contactor.

According to at least one example embodiment, the configuration of the switching arrangement to control the sequence comprises disconnecting a battery pack other than the battery pack having the contactor with the highest increased disconnection wear last.

According to at least one example embodiment, the switching arrangement is configured to:
- detect a damaging current that upon disconnection of the battery packs from the load results in damaging a contactor,
- disconnect the battery pack having the contactor with the highest contactor wear last to intentionally sacrifice such contactor in response of detecting the damaging current.

As mentioned in relation to the first aspect of the invention, the contactor wear may here be referring to the increased disconnection wear, and thus, to disconnect the battery pack having the contactor with the highest increased disconnection wear last to intentionally sacrifice such contactor in response of detecting the damaging current.

According to a third aspect of the present invention, an energy storage system of a vehicle is provided. The energy storage system comprises a plurality of parallelly arranged battery packs for powering a load, and a switching arrangement according to the second aspect of the invention.

According to a fourth aspect of the present invention, a vehicle is provided. The vehicle comprises an energy storage system according the third aspect of the invention, or a switching arrangement according to the second aspect of the invention.

According a fifth aspect of the present invention, a computer program is provided. The computer program comprises program code means for performing the method of the first aspect of the invention, when the program is run on a computer.

Such computer program may e.g. be implemented in an ECU of the vehicle, or e.g. be comprised in a control unit of the switching arrangement.

According to a sixth aspect of the present invention, a computer readable medium carrying a computer program comprising program code means for performing the method of the first aspect of the invention, when the program product is run on a computer, is provided.

Effects and features of the third to sixth aspects of the invention are largely analogous to those described above in connection with the first and second aspects of the invention. Embodiments mentioned in relation to the first and second aspects of the invention are largely compatible with the third to sixth aspects of the invention.

According to at least one example embodiment, applicable to any one of the first to sixth aspects of the invention, the battery packs are adapted for a vehicle, such as e.g. a heavy duty truck.

Further advantages and features of the present invention are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
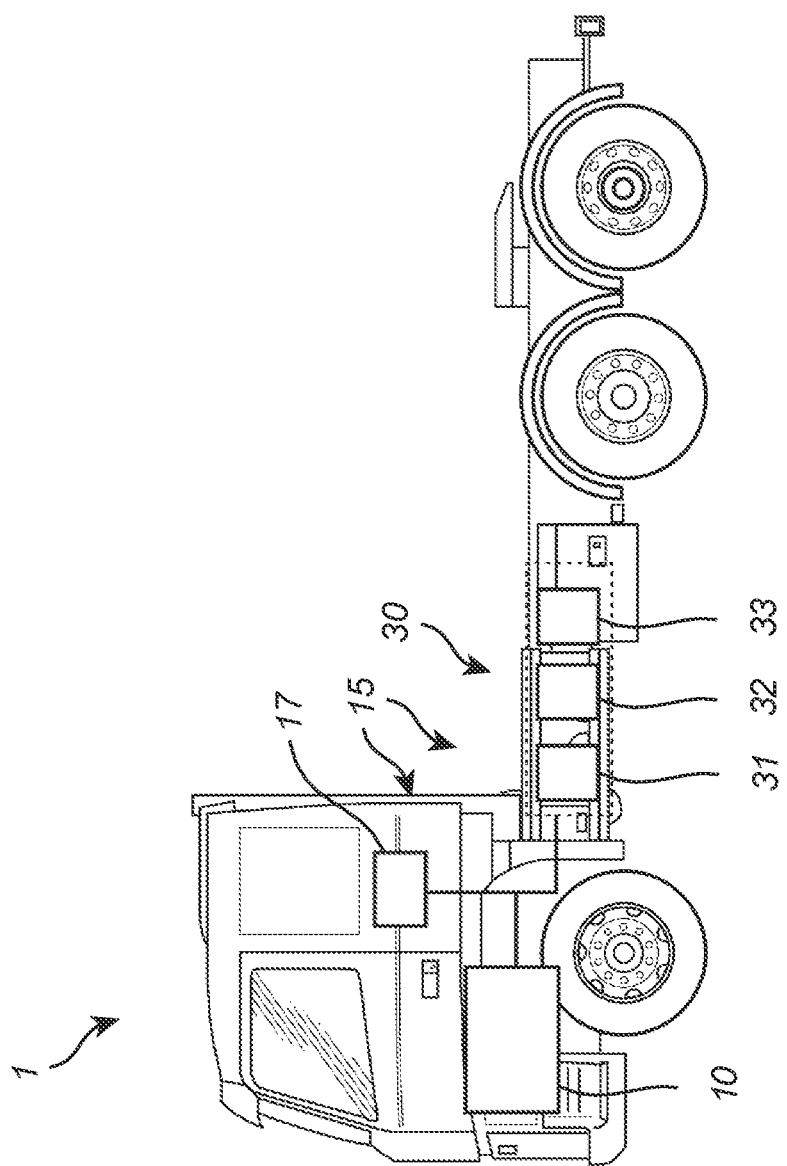
FIG. 1 is a schematic side view of a vehicle comprising a switching arrangement and an energy storage system, in accordance with example embodiments of the invention.

With reference to FIG. 1, a vehicle 1, here embodied as a heavy duty truck 1, is disclosed for which a method, switching arrangement 15, and/or energy storage system of a kind disclosed in the present invention is advantageous. However, the method, the switching arrangement 15 or energy storage system 30 may as well be implemented in other types of vehicles, such as in busses, light-weight trucks, passenger cars, marine applications etc. The vehicle 1 is an electric vehicle, such as a full electric vehicle or a hybrid, comprising at least one electric machine 10 powered by the energy storage system 30, wherein in the example of FIG. 1, the energy storage system comprises three energy storage devices 31, 32, 33, or battery packs 31, 32, 33. The switching arrangement 15 is configured to connected and disconnect the battery packs 31, 32, 33 relative the electric machine 10. Moreover, the switching arrangement 15 comprises a control unit 17 arranged and configured for controlling the operation of the switching arrangement 15. The vehicle 1 typically further comprises other parts of the powertrain such as transmission, drive shafts and wheels (not shown in detail).

Figure 2:
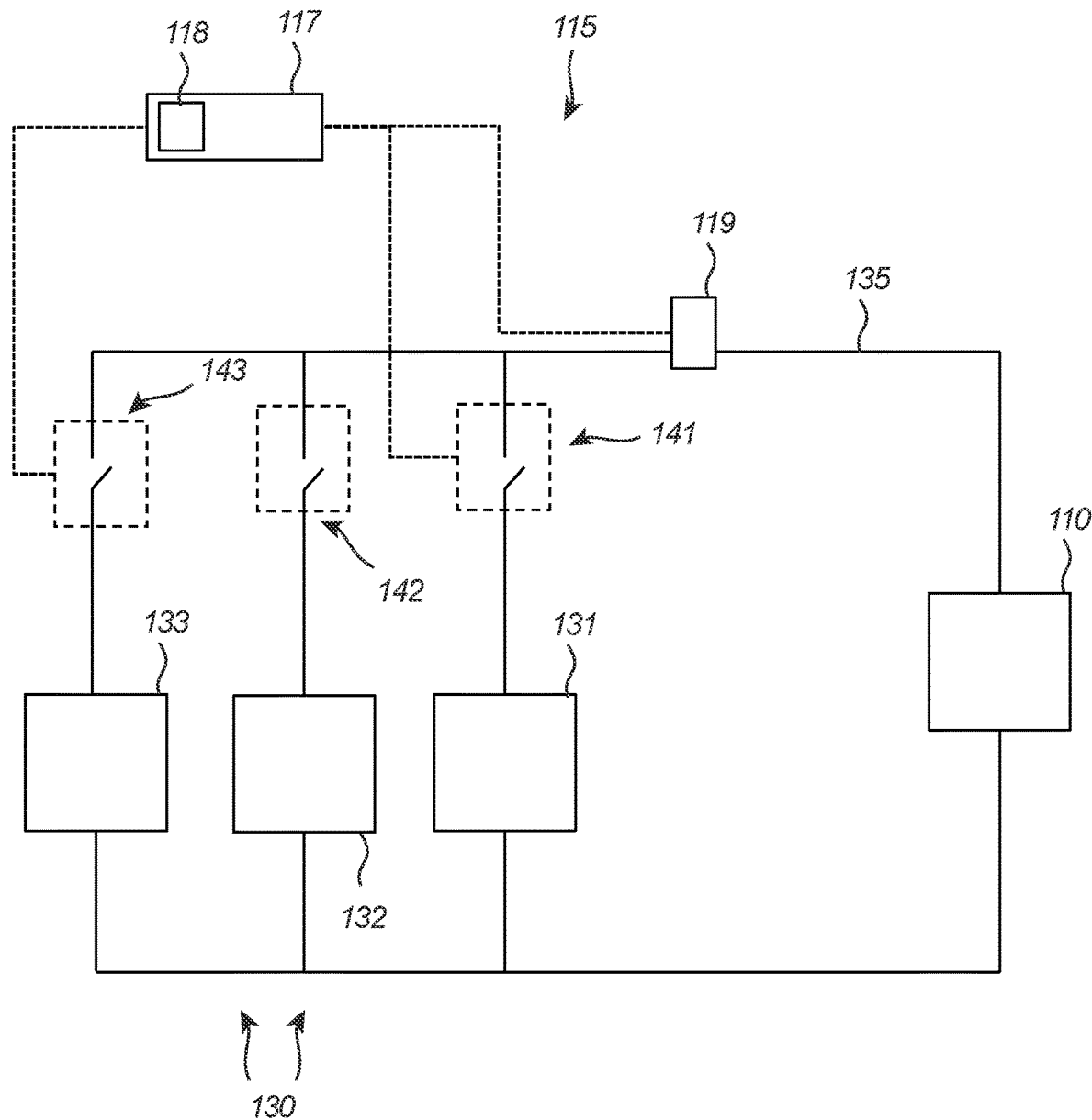
FIG. 2 is a schematic view of a switching arrangement for energy storage system having a plurality of battery packs arranged in parallel for powering a load, in accordance with an example embodiment of the invention.
Figure 3:
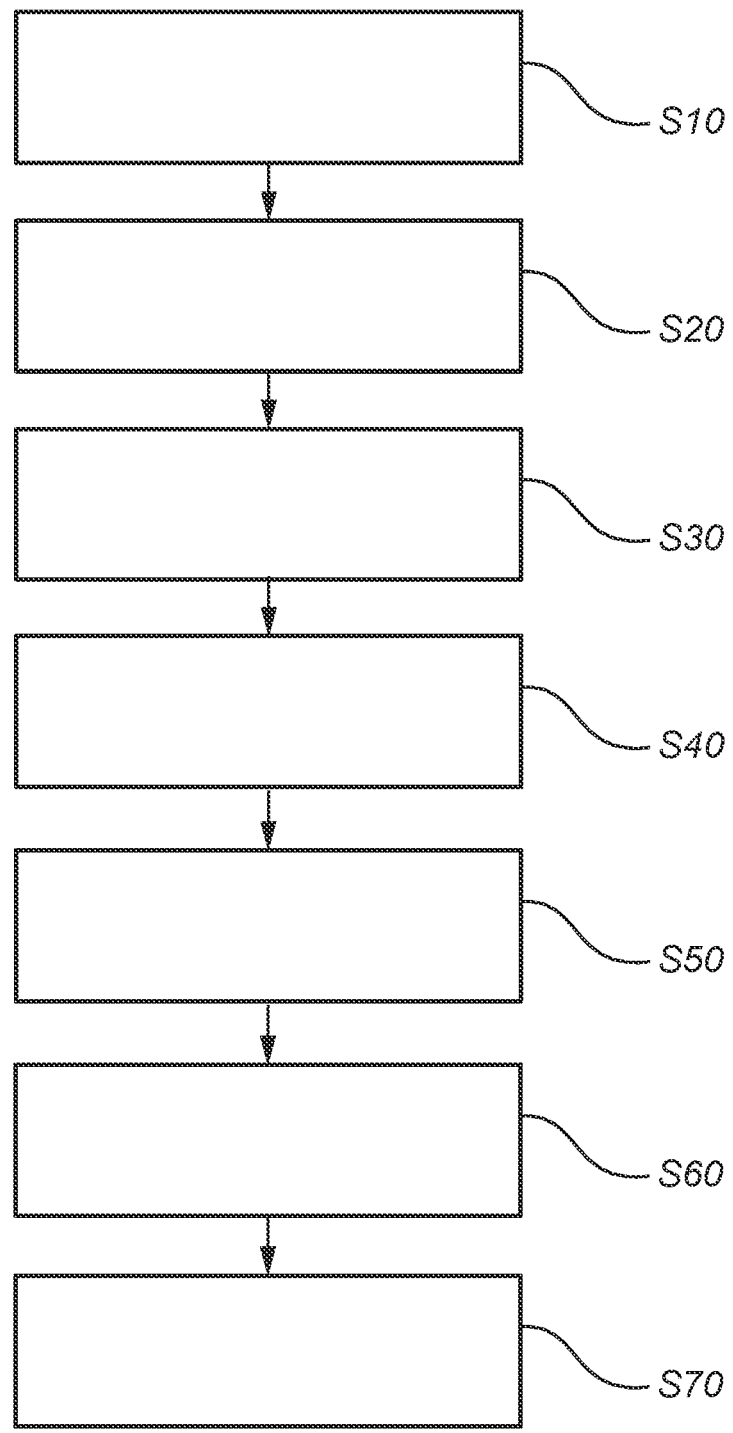
FIG. 3 is a flowchart illustrating the steps of a method in accordance with example embodiments of the invention.

FIG. 2 is a schematic view of a switching arrangement 115 and an energy storage system 130 having a plurality of battery packs 131, 132, 133 arranged in parallel for powering a load 110. The embodiment shown in FIG. 2 may be implemented in the vehicle 1 of FIG. 1, and thus the switching arrangement 115, the energy storage system 130 and the load 110 of FIG. 2, may correspond to the switching arrangement 15, the energy storage system 30 and the electric machine 10 of FIG. 1. Thus, the load 110 in FIG. 2 may be an electric machine.

The energy storage system 130 comprises a first battery pack 131, a second battery pack 132 and a third battery pack 133, but it should be noted that any number of battery packs may be included in the energy storage system 130. The switching arrangement 115 comprises a first contactor 141 configured to connect and disconnect the first battery pack 131 relative the load 110 by closing and opening, respectively, and comprises a second contactor 142 configured to connect and disconnect the second battery pack 132 relative the load 110 by closing and opening, respectively, and comprising a third contactor 143 configured to connect and disconnect the third battery pack 133 relative the load 110 by closing and opening, respectively. Thus, an associated contactor, here being the first, second and third contactors 141, 142, 143 exist for each battery pack, here being the corresponding first, second and third battery packs 131, 132, 133, wherein the first, second and third contactors 141, 142, 143 are configured to connect and disconnect the first, second and third battery packs 131, 132, 133 relative the load 10, by closing and opening the first, second and third contactors 141, 142, 143. As shown in FIG. 2, the first, the second and third battery packs 131, 132, 133 may be connected to the load 110 via a common traction power bus 135 arranged between the first, second and third contactors 141, 142, 143 and the load 110. The first contactor 141, and the corresponding first battery pack 131, are arranged adjacent load 110, while the third contactor 143, and the corresponding third battery pack 133, are arranged furthest away from the load 110, while the second contactor 142, and the corresponding second battery pack 132, arranged between the first and third contactors 141, 143. The load 110 may be powered by the first, second and third battery packs 131, 132, 133 by closing the first, second and third contactors 141, 142, 143, respectively (i.e. by connecting the first, second and third battery packs 131, 132, 133 to the load 110) and the first, second and third battery packs 131, 132, 133 may be disconnected from the load 110 by opening the first, second and third contactors 141, 142, 143. The switching arrangement 115 comprises a control unit 117 arranged and configured for controlling the operation of the switching arrangement 115, which is further described with reference to the flow chart of FIG. 4.

The switching arrangement 115 is, via the control unit 117, configured to disconnect the first, second and third battery packs 131, 132, 133 from the load 110 by means of the first, second and third contactors 141, 142, 143, respectively, such that the first, second and third battery packs 131, 132, 133 are disconnected in a sequence in which one contactor, e.g. the first contactor 141, is opened last and thereby subject to increased disconnection wear. For example, in a first state, being a fully connected state, each one of the first, second and third contactors 141, 142, 143 are closed and each one of the first, second and third battery packs 131, 132, 133 are connected to the load 110, and are thus powering the load 110. In a second state, being a disconnection state, each one of the first, second and third contactors 141, 142, 143 are opened in such a way that each one of the first, second and third battery packs 131, 132, 133 are being disconnected from the load 110, terminating powering of the load 110 (e.g. in response to a shut-off signal of the load 110). In the second state, and for the example embodiment of FIG. 2, two of the battery packs, e.g. the second and third battery packs 132, 133 are disconnected prior to the first battery pack 131 by that the second and third contactors 142, 143 are opened. When the second and third contactors 142, 143 are opened, no (or a very small) electric arc will appear in the air gap of the second and third contactors 142, 143, as the first battery pack 131 is kept connected to the load 110, or a traction power bus 135, and an alternative path of the current is available. Also in the second state, subsequent to opening the second and third contactors 142, 143 and thus disconnecting the second and third battery packs 132, 133 from the load 110, the first contactor 141 is opened to disconnected the first battery pack 131. Thus, the first contactor 141 is opened last, meaning that subsequent to opening the first contactor 141, no battery packs is powering the load. As a result, an electric arc will be formed in the air gap of the first contactor 141, the electric arc being especially prominent as all battery packs 131, 132, 133 of the energy storage system 130 are being disconnected and the inductive circuit involving the load 110 is interrupted or broken. The formation of such electric arc leads to an electric wear of the contactor, here referred to as an increased disconnection wear. Stated differently, when a load, such as the load 110 of FIG. 2 or electric machine 10 of FIG. 1, is shut-off, residue inductance is still present in the system. When disconnecting the first, second and third battery packs 131, 132, 133, such residue inductances may result in sharp rises in voltage across the first, second and/or third contactor 141, 142, 143. Especially for the contactor (here being the first contactor 141) which opens last, the sharp rises in voltage may result in the formation of an electric arc, causing contactor wear, or electric contactor wear. In a third state, being a disconnected state, each one of the first, second and third contactors 141, 142, 143 are open, and each one of the first, second and third battery packs 131, 132, 133 are disconnected from the load 110. Thus, the load 110 is not powered by the energy storage system 130.

Assuming equal contactor wear, or at least equal electric wear or equal electric wear associated with the increased disconnection wear, prior to such disconnection of the battery packs, the first contactor 141 will have an accumulated disconnection wear which is higher than the second and third contactors 142, 143. In other words, the first contactor 141 is more likely to be subject to component failure compared to the second and third contactors 142, 143.

The switching arrangement 115 is, via the control unit 117, further configured to control the sequence in which the first, second and third battery packs 131, 132, 133 are disconnected in such a way that the increased disconnection wear is accounted for and used to distribute contactor wear among the first, second and third contactors 141, 142, 143 during subsequent disconnections of the battery packs 131, 132, 133 from the load 110. In other words, the increased disconnection wear of the first contactor 141 as described above, is taken into account during a subsequent repetition of the first, second and third states. According to at least one example embodiment, the sequence comprises disconnecting a battery pack 132, 133 other than the battery pack 131 having the contactor 141 with the highest increased disconnection wear last. In the example given above, the first contactor 141 has the highest increased disconnection wear among the first, second and third contactors 141, 142, 143. Thus, in a subsequent disconnection of the battery packs 131, 132, 134, as in the second state described above, the second contactor 142 or third contactor 143 will be disconnected last and subject to the increased disconnection wear. In case one contactor is exchanged, and a new contactor with no accumulated disconnection wear is replacing the old contactor, such contactor will more frequently be disconnected last as a result of distributing the contactor wear, such as the electric contactor wear or increased disconnection wear, among the contactors.

According to at least one example embodiment, the switching arrangement 115 is configured to keep track of at least the increased disconnection wear of each of the first, second and third contactors 141, 142, 143. Additionally, the switching arrangement 115 may be configured to keep track of the electric wear originating from other sources than the increased disconnection wear, of each of the first, second and third contactors 141, 142, 143. As seen in FIG. 2, the switching arrangement 115 further comprises a memory 118 comprised in the control unit 117. Such memory 118 may be used to keep track of the increased disconnection wear, and possibly the electric wear, of the contactors 141, 142, 143.

The switching arrangement 115 may, via the control unit 117, further be configured to connect the first, second and third battery packs 131, 132, 133 by means of the first, second and third contactors 141, 142, 143, respectively, for powering the load 110. Thus, between subsequent disconnection of the battery packs 131, 132, 133, the battery packs 131, 132, 133 are connected to the load 110. The switching arrangement 115 may, via the control unit 117, be further configured to alternately connect and disconnect the first, second and third battery packs 131, 132, 133, relative the load 110 wherein, during disconnections from the load 110, the switching arrangement 115 is configured to control the sequence in which the first, second and third battery packs 131, 132, 133 are disconnected from the load 110. The sequence may e.g. comprise cycling which of the first, second and third battery packs 131, 132, 133 that is being disconnected last, and thus which of the first, second and third contactors 141, 142, 143 that is being opened last, and thus subject to increased disconnection wear.

As shown in FIG. 2, the control unit 117 may be further configured to detect the current at the common traction bus 135 by means of a sensor 119. Assuming that one of the contactors, e.g. the first contactor 141, has the highest contactor wear, or the highest electric wear, e.g. indicated by the increased disconnection wear which has been accumulated over time and been kept track of by means of the memory 118. In response of that the control unit detects a damaging current that upon disconnection of the battery packs 131, 132, 133 from the load 110 results in damaging a contactor, the switching arrangement 115 may be configured to disconnect the battery pack, here the first battery pack 131, having the contactor 141 with the highest contactor wear or highest electric wear, last. Hereby, the first contactor 141 is intentionally sacrificed.

It should be mentioned that the switching arrangement may further comprise a first secondary contactor arranged in parallel to the first contactor 141, wherein the first secondary contactor is arranged in series with a first pre-charge resistor, and comprise a second secondary contactor arranged in parallel to the second contactor 142, wherein the second secondary contactor is arranged in series with a second pre-charge resistor, and comprise a third secondary contactor arranged in parallel to the third contactor 143, wherein the third secondary contactor is arranged in series with a third pre-charge resistor. Moreover, the first battery pack 131 may be connected in series with a first pre-contactor arranged on the opposite side of the first battery pack 131 as compared to the first contactor 141. Correspondingly, the second battery pack 132 may be connected in series with a second pre-contactor arranged on the opposite side of the second battery pack 132 as compared to the second contactor 142, and the third battery pack 133 may be connected in series with a third pre-contactor arranged on the opposite side of the third battery pack 133 as compared to the third contactor 143.

The operation of a switching arrangement, as the switching arrangement 115, will now be described in more general terms with additional reference to FIG. 4. FIG. 4 is a flowchart describing the steps of a method for operating a switching arrangement of an energy storage system, the energy storage system comprising a plurality of parallelly arranged battery packs, e.g. the first, second and third battery packs 131, 132, 133 of FIG. 2, and the switching arrangement comprising an associated contactor for each battery pack, as the first, second and third contactors 141, 142, 143 of FIG. 2. The contactors are configured to connect and disconnect the battery packs relative a load by closing and opening, respectively.

In a first step S10, the battery packs are disconnected from the load by means of the contactors such that the battery packs are disconnected in a sequence in which one contactor is opened last and thereby subject to increased disconnection wear. The increased disconnection wear is typically caused by inductance.

In a second step S20, the sequence in which the battery packs are disconnected are controlled in such a way that the increased disconnection wear is accounted for and used to distribute contactor wear among the contactors during subsequent disconnections of the battery packs from the load. According to one example embodiment, the first step S10 is included in the controlled sequence of disconnection in the second step S20. For example, this can be achieved as described with reference to FIG. 2 and the second state.

In a third step S30, the battery packs are connected by means of the contactors for powering the load. Thus, the contactors are closed to connected the associated battery pack. It should be noted that not all battery packs need to be connected each time the load is to be powered by the energy storage system. For example, in case the load is only requiring two out of three battery packs in order to be powered, the third battery pack, and thus the associated contactor to the third battery pack, may rest during such case. During disconnection of the connected battery packs, the controlled sequence of disconnection by the switching arrangement will be applied to the battery packs being connected to powering the load.

In a fourth step S40, the battery packs are alternately connected and disconnected relative the load, and the steps of disconnection include controlling the sequence in which the battery packs are disconnected. In other words, the fourth step S40 comprises repeatedly performing the second and third steps S20, S30 of connecting and disconnecting the battery packs relative the load. Thus, the controlled sequence of disconnection by the switching arrangement will be applied over time and during the operation of the energy storage system. For example, the controlled sequence of disconnection by the switching arrangement may comprise cycling which battery pack that is being disconnected last. Typically, the sequence in which the battery packs are disconnected in the second and/or fourth steps S20, S40 comprises disconnecting a battery pack other than the battery pack with the associated contactor having the highest increased disconnection wear last.

In a fifth step S50, typically being performed in parallel to the first, second, and/or fourth steps S10, S20, S40, at least the increased disconnection wear of each contactor is tracked. Thus, during the steps of controlling the sequence in which the battery packs are disconnected, at least the increased disconnection wear of each contactor is kept track of. This may e.g. be performed by storing such data in a memory as described with reference to FIG. 2.

In a sixth step S60, a damaging current that upon disconnection of the battery packs from the load results in damaging a contactor is detected.

In a seventh step S70, the sequence in which the battery packs are disconnected, i.e. during the second or fourth steps S20, S40, are performed to disconnect the battery pack having the contactor with the highest contactor wear last to intentionally sacrifice such contactor in response of detecting the damaging current in the sixth step S60. That is, the seventh step S70 may be comprised in the second step S20 and/or the fourth step S40.

It should be noted that the naming of the steps not necessarily, but might according to at least one example embodiment, relate to the order in which the steps are carried out, unless explicitly stated otherwise. For example, the fifth, sixth and seventh steps S50, S60, S70 are typically performed parallel, or together with, the fourth step S40. Thus, one or more of the steps may be combined and carried out simultaneously. The switching arrangement of FIG. 2 may be configured to carry out one or several of the steps S10-S70.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for operating a switching arrangement of an energy storage system, the energy storage system comprising at least three parallelly arranged battery packs and the switching arrangement comprising an associated contactor for each battery pack, the contactors being configured to connect and disconnect the battery packs relative a load by closing and opening, respectively, the method comprising:
    disconnecting the battery packs from the load by means of the contactors such that the battery packs are disconnected in a sequence in which one contactor is opened last and thereby subject to increased disconnection wear, wherein after such disconnection, no battery pack is connected to the load,
    controlling the sequence in which the battery packs are disconnected in such a way that the increased disconnection wear is accounted for and used to distribute contactor wear among the contactors during subsequent disconnections of the battery packs from the load.

2. The method according to claim 1, comprising:
    connecting the battery packs by means of the contactors for powering the load,
    alternately connecting and disconnecting the battery packs, wherein the steps of disconnecting include controlling the sequence in which the battery packs are disconnected.

3. The method according to claim 1, wherein the sequence comprises cycling which battery pack that is being disconnected last.

4. The method according to claim 1, wherein controlling the sequence in which the battery packs are disconnected comprises keeping track of at least the increased disconnection wear of each contactor.

5. The method according to claim 4, wherein the sequence in which the battery packs are disconnected comprises disconnecting a battery pack other than the battery pack with the associated contactor having the highest increased disconnection wear last.

6. The method according to claim 4, comprising
    detecting a damaging current that upon disconnection of the battery packs from the load results in damaging a contactor, wherein the sequence in which the battery packs are disconnected comprises disconnecting the battery pack having the contactor with the highest contactor wear last to intentionally sacrifice such contactor in response of detecting the damaging current.

7. The method according to claim 1, wherein the increased disconnection wear is caused by inductance.

8. A switching arrangement for an energy storage system in a vehicle, the energy storage system comprising at least three parallelly arranged battery packs, the switching arrangement comprises:
    an associated contactor for each battery pack, the contactors being configured to connect and disconnect the battery packs relative a load by closing and opening, respectively, wherein the switching arrangement is configured to:
    disconnect the battery packs from the load by means of the contactors such that the battery packs are disconnected in a sequence in which one contactor is opened last and thereby subject to increased disconnection wear, wherein after such disconnection, no battery pack is connected to the load,
    control the sequence in which the battery packs are disconnected in such a way that the increased disconnection wear is accounted for and used to distribute contactor wear among the contactors during subsequent disconnections of the battery packs from the load.

9. The switching arrangement according to claim 8, configured to:
    connect the battery packs by means of the contactors for powering the load,
    alternately connect and disconnect the battery packs, wherein, during disconnections, the switching arrangement is configured to control the sequence in which the battery packs are disconnected.

10. The switching arrangement according to claim 8, wherein the configuration of the switching arrangement to control the sequence comprises cycling which battery pack that is being disconnected last.

11. The switching arrangement according to claim 8, wherein the switching arrangement is configured to keep track of at least the increased disconnection wear of each contactor.

12. The switching arrangement according to claim 11, wherein the configuration of the switching arrangement to control the sequence comprises disconnecting a battery pack other than the battery pack having the contactor with the highest increased disconnection wear last.

13. The switching arrangement according to claim 11, wherein the switching arrangement is configured to:
    detect a damaging current that upon disconnection of the battery packs from the load results in damaging a contactor,
    disconnect the battery pack having the contactor with the highest contactor wear last to intentionally sacrifice such contactor in response of detecting the damaging current.

14. An energy storage system of a vehicle, the energy storage system comprising a plurality of at least three parallelly arranged battery packs for powering a load, and a switching arrangement according to claim 8.

15. A vehicle comprising an energy storage system according to claim 14.

* * * * *